US008199006B2

(12) United States Patent
Liu et al.

(10) Patent No.: US 8,199,006 B2
(45) Date of Patent: Jun. 12, 2012

(54) COMPUTING DEVICE THAT DETECTS HAND PRESENCE IN ORDER TO AUTOMATE THE TRANSITION OF STATES

(75) Inventors: Eric Liu, Santa Clara, CA (US); Sagar Savant, Sunnyvale, CA (US); Peter Sobczak, San Diego, CA (US); Charles Lee, Mountain View, CA (US); Peter Skillman, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1009 days.

(21) Appl. No.: 11/948,934

(22) Filed: Nov. 30, 2007

(65) Prior Publication Data

US 2009/0140863 A1 Jun. 4, 2009

(51) Int. Cl.
*G08B 1/08* (2006.01)
*G08B 21/00* (2006.01)

(52) U.S. Cl. ............... 340/540; 340/539.1; 340/309.16

(58) Field of Classification Search .................. None
See application file for complete search history.

(56) References Cited

U.S. PATENT DOCUMENTS

| 7,633,076 | B2 * | 12/2009 | Huppi et al. ............. 250/559.36 |
| 2002/0021278 | A1 * | 2/2002 | Hinckley et al. ............... 345/156 |
| 2005/0162402 | A1 * | 7/2005 | Watanachote ............... 345/173 |
| 2006/0019724 | A1 * | 1/2006 | Bahl et al. .................... 455/574 |
| 2006/0111093 | A1 * | 5/2006 | Shim et al. .................... 455/418 |
| 2007/0267473 | A1 * | 11/2007 | Thayer ......................... 235/375 |
| 2008/0316181 | A1 * | 12/2008 | Nurmi .......................... 345/173 |

* cited by examiner

*Primary Examiner* — Julie Lieu

(57) ABSTRACT

A computing device is configured to make a determination as to whether a device is being held in a hand. In response to determining that the device is being held, the device transitions itself, or one or more of its hardware or software component, into a particular state of operation.

25 Claims, 3 Drawing Sheets

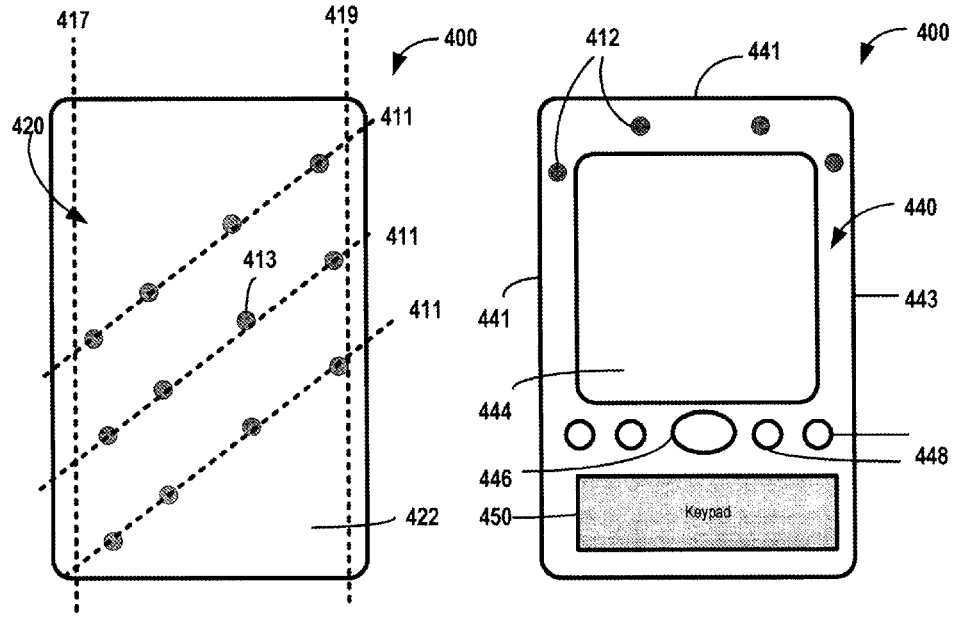
FIG. 4A  FIG. 4B
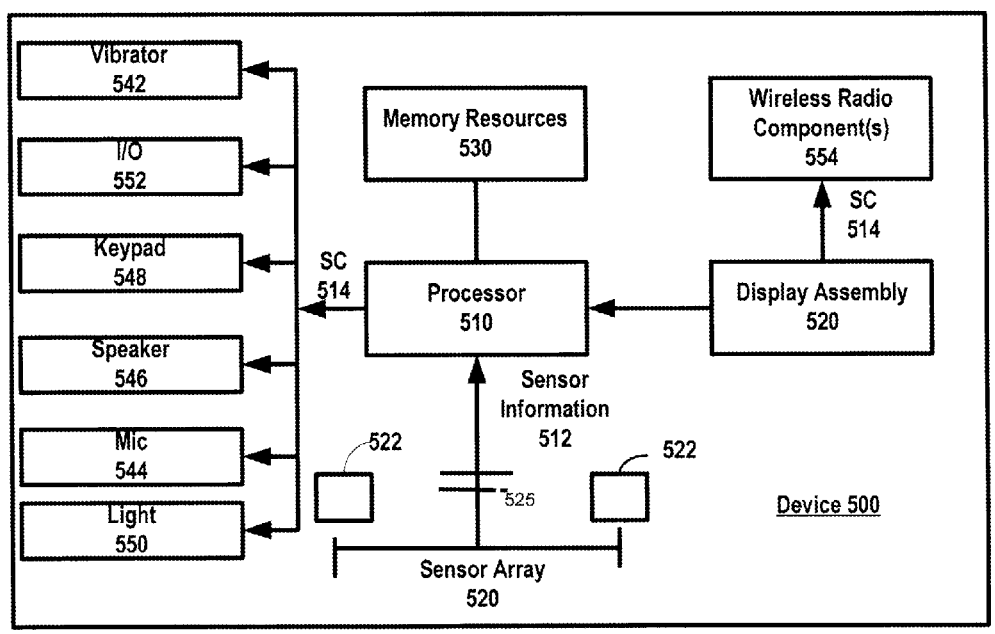
FIG. 5

COMPUTING DEVICE THAT DETECTS HAND PRESENCE IN ORDER TO AUTOMATE THE TRANSITION OF STATES

TECHNICAL FIELD

This application pertains to computing devices, and more particularly, to a computing device that detects hand presence in order to automate the transition of states on the device.

BACKGROUND

Computing devices, particularly handheld and portable devices, have evolved to include numerous types of communication capabilities and functionality. For example, handheld devices exist that operate as cellular phones, messaging terminals, Internet devices, while including personal information management (PIM) software and photo-management applications. Additionally, Internet Protocol services exist that can transform Internet-enabled machines into telephony devices. Even stand-alone telephones that connect to traditional Public Switched Telephone Networks (PSTN) are including more software to enhance the telephone's functionality.

In enhancing communication capabilities and functionality, effort has been made to enhance and assist the user in using such devices. For example, software features exist to facilitate the ease in which the user can act on a phone number in an email message. A sequence of phone numbers can be presented to a user for selection, and upon such selection being made, a telephony application uses the phone number in making a phone call. Small form-factor computing devices, such as devices that provide cellular phone functionality, have particular use for such short-cut functionality, in order to reduce the manual involvement of the user. These devices have smaller keyboards that may be harder to operate, and/or use in mobile or dynamic environments, where the user cannot readily retrieve a desired number.

Telephony devices are just one type of communication device. There are now many types of communication types, and multi-functional devices exist to accommodate the different communication types. Examples of communication types other than telephony include email, instant message (including SMS protocol messages and Multimedia Message Service (MMS) protocol messages), and video conferencing. Many computing devices, particularly smart phones, are enabled to support communications using multiple communication mediums.

Because mobile computing devices are often small and carried in the person's pocket, purse or other similar medium, the mobile computing devices typically enable key-guard features to prevent inadvertent use of the device. For example, cellular telephones sometimes employ a key-guard feature as a software control mechanism, where the device must first be unlocked by the user entering a specific combination of two or more keys. Once unlocked, the user is then able to use a dialpad or keypad. While key-guards can be effective in preventing inadvertent entry of keys from the dialpad or keypad, they are also inconvenient. For example, a user who would otherwise normally have to enter 7 keys to dial a phone number may have to press 9 keys to unlock and then dial.

BRIEF DESCRIPTION OF THE DRAWINGS

FIG. 4A and FIG. 4B illustrate implementation of a sensor array for detecting human skin contact, under one or more embodiments.

FIG. 5 is a hardware diagram of a mobile computing device, under an embodiment.

DETAILED DESCRIPTION

Figure 1:
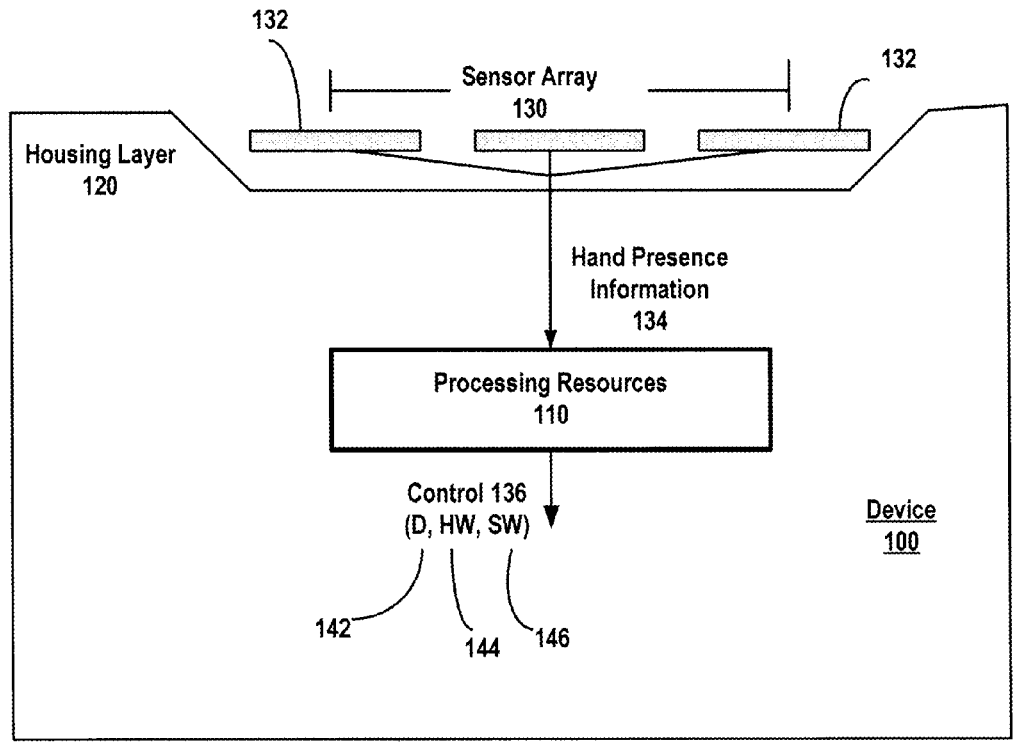
FIG. 1 is a simplified block diagram of a mobile computing device mobile that is configured to perform specific functions in response to detecting presence of a user's hand, under an embodiment of the invention.

Embodiments described herein provide for a computing device that is equipped to detect the presence of a user's hand in order to determine whether the device is being held. A determination that the device is being held may trigger the computing device to affect a mode, power level or functional state of the device or its components. For example, a determination that the device is being held may cause the device to activate its resources in anticipation of the device being used. As another example, a determination that the device is being held may cause the device to automatically switch off its key-guard feature. Numerous implementations and examples exist by which the device may transition states or otherwise affect its own operation through the determination that the device is being held.

Embodiments provide that the detection of the user's hand may actually correspond to detection of finger tips or the palm of the hand. Furthermore, a detection of hand presence may be interpretable with or without additional considerations, such as the duration of contact, or the number or pattern of sensors that are contacted. In an embodiment, the presence of the user's hand is detected through an array or combination human skin contact sensors. According to an embodiment, the human skin contact sensors may detect human skin contact and also be arranged or otherwise configured to determine information that is indicative of the human skin contact being from a user's hand (i.e. the user holding the device). Thus, for example, fingers gripped around the housing of a mobile computing device may be detected and interpreted as being indicative of the device being held.

In embodiment, a computing device detects presence of a user's hand (i.e. that the device is being held) and then transitions the state of the device or one or more of its components. In detecting hand presence, embodiments described herein enable any one of many possible functions and operations, including functionality to ready the device for use, conserve power, or otherwise trigger on or off other designated functions or devices.

According to an embodiment, a computing device is configured to make a determination as to whether a device is being held in a hand. In response to determining that the device is being held, the device transitions itself, or one or more of its hardware or software component, into a particular state of operation.

In an embodiment, the determination that the device is being held is made through the use of human skin contact sensors, such as capacitive sensors. The sensors may be selectively placed in locations where fingers or palms are likely to be placed when the user holds the device. Multiple sensors may form an array that detects multiple contacts from a finger or palm.

As an addition or alternative, the determination that the device is being held may include a timing element. In one embodiment, the human skin contact must be detected for a duration that exceeds some threshold. Such a timing requirement may distinguish instances of when the user wishes to hold the device for use from instances when, for example, a user may move a device.

According to another embodiment, a computing device includes processing resources, a housing, and a plurality of sensors. The processing resources may include one or more processors that are operable to enable use of a plurality of software components and a plurality of hardware components. The housing may retain the one or more processors and other electrical components of the computing device. A plurality of sensors may be provided on or with the housing. The plurality of sensors may be configured to detect an electrical characteristic of a hand of a user in contact with the device. The processing resources are configured to make a determination as to whether the computing device is being held in the hand based at least in part on whether the electrical characteristic of the hand is detected by one or more of the plurality of sensors. The processor may also be configured to transition the device, or one or more of each of the plurality of software or hardware components, into a particular state of operation based on the determination.

Under another embodiment, a mobile computing device may be configured to maintain a programmatic control feature to prevent inadvertent use of a keypad of a mobile computing device. The device may make programmatic determinations that the computing device is held in a user's hand. In response to making the determination, the device may automatically disable the programmatic control feature to enable use of the keypad of the mobile computing device.

Still further, another embodiment provides for a housing of a computing device to structured to include a front face that provides a plurality of interface features (e.g. keypad, display component, multi-way input feature, buttons etc.), and a back face that is provided at least some of the sensors in an array of sensors. Each of the sensors on the back face are positioned to detect a contact by a user at a location that has previously been determined to be a likely place where human skin contact is to occur when the user is operating the device.

Still further, another embodiment provides a computing device that includes processing resources, including one or more processors that are operable to enable use of a plurality of software components and a plurality of hardware components. The computing device may also include a housing that retains the one or more processors and other electrical components of the computing device. The housing may include a front face and a back face. A plurality of interface features may be provided on the front face of the housing. The plurality interface features may include a contact or touch sensitive display component, a multi-way input feature, and a keypad. A plurality of sensors may be configured to detect an electrical characteristic of a hand of a user in contact with the device. The processing resources may be configured to make a determination as to whether the computing device is being held in the hand based at least in part on whether the electrical characteristic of the hand is detected by one or more of the plurality of sensors. The processor is configured to transition any one or more of the plurality of interface features into a particular state of operation based on the determination.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

Additionally, one or more embodiments described herein may be implemented using modules. A module may include a program, a subroutine, a portion of a program, or a software component or a hardware component capable of performing one or more stated tasks or functions. As used herein, a module can exist on a hardware component independently of other modules, or a module can be a shared element or process of other modules, programs or machines.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Device Overview

FIG. 1 is a simplified block diagram of a mobile computing device mobile that is configured to perform specific functions in response to detecting presence of a user's hand, under an embodiment of the invention. Under an embodiment, a computing device 100 may include processing resources 110 and a housing layer 120.

The housing layer 120 may correspond to a shell, or combination of exterior surfaces that combine to provide a shape for the device, and also to retain electrical components, such as printed circuit boards and modules. In one implementation, the mobile computing device 100 may be hand-sized, so that, for example, it may be grasped in one hand when in use. The housing layer 120 may be constructed of plastic or other molded elements. Other materials that may be used to form some or all of the housing include, for example, rubber or metal.

A sensor array 130 may be provided with the housing layer 120. In an embodiment, the sensor layer 130 includes a plurality of selectively positioned sensors 132 that are integrated or cooperatively positioned on or with a surface of the housing layer 120. However, one or more embodiments also contemplate the use of just a single sensor. In one implementation individual sensors 132 of the sensor layer 130 are incorporated into a thickness of the surface of the housing. As an alternative, the sensors may be placed under, or beneath an interior surface of the housing layer 120. Still further, individual sensors 132 may be placed on an exterior surface of the housing layer 120.

The sensor array 130 may operate to detect a presence of a hand on the housing. In one embodiment, individual sensors 132 of the sensor array 130 are configured to detect an electrical characteristic of skin, such as capacitance or even resistivity. Thus, for example, sensor array 130 may comprise a plurality of capacitive sensors. As an alternative or addition, one or more sensors 132 may correspond to conductive sensors which enable current or potential creation in the presence of contact by human skin. As described elsewhere, such current or potential generation may be characteristic to human skin based on, for example, a frequency of the created potential or current.

In an embodiment, the sensor array 130 communicates hand presence information 134 to the processing resources 110. The processing resources 110 may include one or more processors that are contained in the housing layer 120. For example, the device 100 may be a multi-processor device. Hand presence information 134 includes data that is indicative of the presence of a hand. More specifically, under one embodiment, the hand presence information 134 may be based on, or correspond to data that indicates (i) there is human skin contact with the device, (ii) the human skin contact is likely a hand, and/or (iii) the hand presence is indicative of the device being in a state of near use. Information corresponding to presence of human skin contact may be determined from sensor values of any one or more sensors in the array 130. For example, in the implementation where the sensors 132 are capacitive, a designated range of sensor values may be known to be indicative of human contact, or otherwise in excess of a threshold that excludes some forms of non-human contact. Identification of which sensors 132 in the array have such human skin contact readings may distinguish when a hand is present, as opposed to some other contact (e.g. isolated finger). Optionally, the detection of hand presence may be correlated with other information that is indicative of the device being in a state of near use. Such other information may correspond to, for example, measuring a duration of time that the hand presence is detected.

For example, if the duration exceeds some threshold (e.g. 1-3 seconds thresholds), any human skin contact may be detected as a hand. As an alternative or variation, if multiple sensors detect human skin contact, a lesser time threshold may be needed make the programmatic determination that the hand is present. Still further, some embodiments may not require a time criteria when making the determination that human skin contact is hand presence.

In one implementation, the hand presence information 134 includes sensor readings at a given instance of time from each of the sensors 132. For example, the hand presence information 134 may include capacitive values that the processing resources 110 may interpret in order to make a determination as to whether a hand is holding the device.

Alternatively, an embodiment provides that the hand presence information 134 is interpreted by integrated circuits or components that are provided or integrated with the sensors 130 or the individual sensors 132. More specifically, the processing resources 110 may include integrated circuitry contained or associated with the sensors 132 that serve to differentiate and determine the nature of the object detected. In one implementation, the integrated circuitry identifies whether the contact is by skin, or whether the contact fits the pattern or criteria of a hand (see FIG. 4A and FIG. 4B). For example, capacitive values that are read from individual sensors may be interpreted, or alternatively processed (e.g. compiled into one value) to provide a determination as to whether the hand is present. As such, the processing resources 110 for making the determination of the hand presence may be distributed to include integrated circuits or other processing that is provided with the sensor array 130. In one embodiment, the sensors 132 include analog-digital conversion components to convert, for example, detected analog capacitive (or conductive) values into a digital value.

A central processor other element of the processing resources 110 may use the hand presence information 134 to communicate control 136 to transition one or more states of the mobile computing device 142, its hardware components 144, or its software components 146. The transitions in state that can be caused through the communication of control 136 may include transition of power state, illumination state (of anyone of many components), active or ready-for-use states, and modes of operation. Numerous such state transitions are described in greater detail with an embodiment of FIG. 2.

Figure 2:
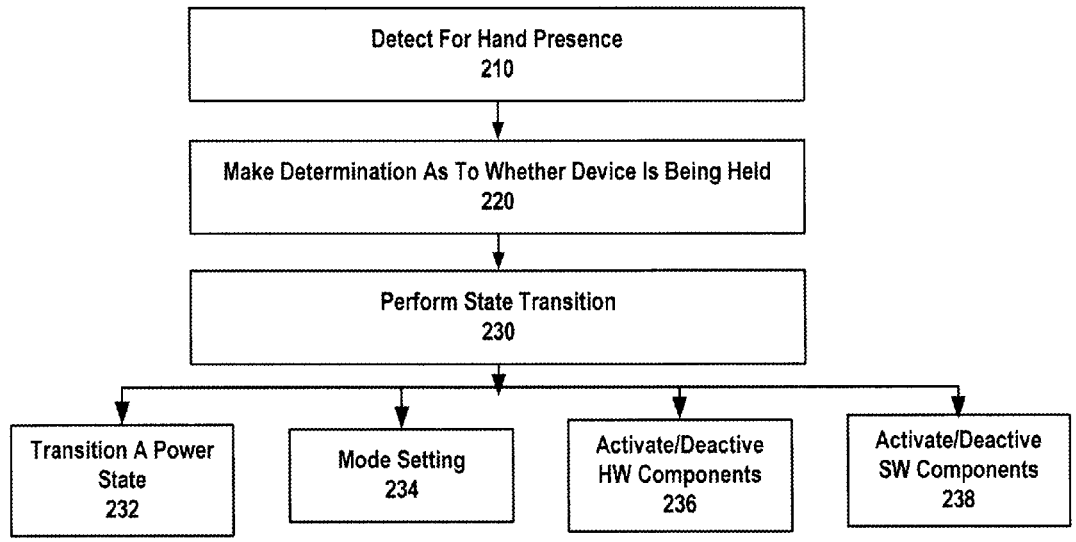
FIG. 2 illustrates a method for controlling a mobile computing device to transition states based on a determination that the device is being held in the hand of a user, under an embodiment of the invention.

FIG. 2 illustrates a method for controlling a mobile computing device to transition states based on a determination that the device is being held in the hand of a user, under an embodiment of the invention. A method such as described with FIG. 2 may be implemented using components such as described with FIG. 1. Accordingly, reference may be made to elements of FIG. 1 for purpose of illustrating components for performing a step or sub-step being described.

In step 210, detection for hand presence is performed. In an embodiment, detection of hand presence is performed by a processor (e.g. CPU) polling the sensor array 130 for hand presence information 132. Alternatively, integrated circuits may be provided in connection with the sensors to poll the sensors for sensor values. When a suitable sensor value is detected, the integrated circuits may communicate with the processor of the computing device, such as by way of waking the processor. The polling for hand presence information 132 may be performed, for example, any time the device is on, or when the device is in a particular state of or mode of operation.

In step 220, the processing resources 110 of the device make a determination that the device is being held in the hand of the user. The determination may be made by a combination of factors, including (i) sensor values (e.g. capacitive readings), (ii) the sensor reading pattern from the array, and/or (iii) the duration in which the sensor readings are present or indicative of the presence of human skin or hand. With regard to sensor values, for example, the processing resources 110 may be configured to interpret that a certain range of sensor readings are a marker for human skin contact. In the case where sensors 132 are capacitive, a range of capacitive values may provide a marker for human skin contact.

Likewise, an embodiment may require more than just one of many sensors 132 to detect human skin contact. Rather, a pattern, or a designated number of sensors may be required to detect human skin contact. With reference to an embodiment of FIG. 4A and FIG. 4B, for example, a combination of two or more sensors, or human skin reading at two or more pre-associated locations, may be needed to interpret the human skin contact is from a hand. Requiring multiple sensors, or a pattern of sensors to detect human skin contact enables the device to distinguish the hand from inadvertent finger contact.

Additionally, the duration of time that the sensor readings detect human skin contact may distinguish incidental touches from instances when the device can more safely assume that the device is about to be in use. For example, the user may move a device while rummaging through a purse. In an embodiment in which there is a requirement of the human skin contact extending beyond a time duration, the device is able to distinguish such brief grasp and release moments from cases when the user grasps the device with the intent to use the device.

Once the determination is made that the device is being held, step 230 provides that the processing resources 110 (e.g. the CPU) performs a state transition. As described with an embodiment of FIG. 1, the state transition may be implemented for the device, a hardware component or set of components, or software components or functions on the device.

In an embodiment, the processing resources 110 may perform state transitions that correspond to any one or more of the sub-steps 232-238. In sub-step 232, a power state transition may be performed for the device, or for one or more of its components. For example, in one embodiment, the operational state of the device as a whole may be made higher (i.e. more operational) in response to determining the hand presence. The device state may be heightened by a combination of increasing the power consumption of the processor, display and other components. As a specific example, the device may be transitioned from a sleep state into an awake state, or from a low power awake state into a highest powered and active state.

The performance of sub-step 232 may also be specific to just one or an isolated set of components. For example, in the case where the mobile computing device is a telephony device, the power state transition may correspond to any one or more of (i) powering a cellular radio on the device, and (ii) powering a display on the device. Other examples of components that may be powered up when the hand presence determination is made include a backlighting component, a display (e.g. device LCD), or other illuminatable component.

Still further, a CPU of the device may be powered or awakened in response to the determination of step 220. For example, as described with an embodiment of FIG. 5, an integrated circuit combination may poll or otherwise communicate with the sensors to determine human skin contact or hand presence. When the integrated circuit combination detect the hand presence, the circuits may signal the CPU to wake, or become more active. In one implementation, for example, the CPU may be asleep, and waken by the integrated circuit combination detecting the presence of the hand.

As an addition or alternative to other sub-steps or state transitions performed by the processing resources, the sub-step 234 provides that the device performs a mode setting operation as (part of) performing the state transition. For example, the device may include a specific mode setting where its character entries or recognized alphabetically by default whenever the user is grasping the device. In such cases, the determination of the hand presence may cause the device to automatically transition into the default character entry state. The user may then perform some action to use the state, or alternatively, change the state.

As an alternative or variation to sub-step 232, an embodiment provides in sub-step 236 that hardware components of the device may be activated or otherwise made operational based on detecting hand presence. For example, a touch screen feature of a device's display assembly may be made operational only when the determination is made that the device is being held in the hand of the user. Absent the determination, the LCD or other display assembly may only be able to turn without the touch-sensitive feature. Likewise, buttons (such as place call button on telephony devices) may be usable only when the hand presence determination is made.

According to an embodiment, a sub-step 238 provides that a software component or feature is made active (or de-activated) based on the hand presence determination. For example, if a determination is made that the device is being held, then the device may be programmed to assume the user will interact with the device (i.e. anticipate momentary interaction by the user). Applications such as wireless synchronization may be suspended or delayed in response, so that when the user starts using the device, performance is not impacted by background tasks.

As another variation, the wireless synchronization or push-email applications may be executed when the user is detected as grasping the device. In such cases, the devices wireless communications are performed automatically on a need-to-basis (i.e. such as when the user is holding the device). Thus, power conservation may be achieved in that the device does not perform its wireless operations when, for example, the user is asleep.

Figure 3A:
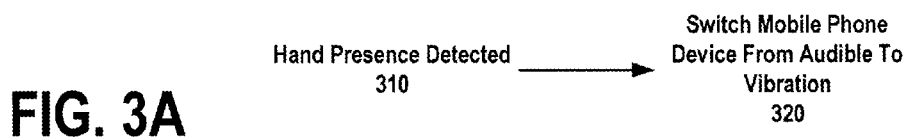
FIG. 3A thru FIG. 3C illustrate specific implementations of how one or more embodiments may be performed.
Figure 3B:
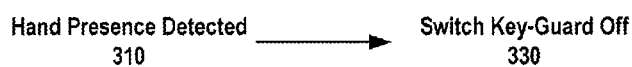
Figure 3C:
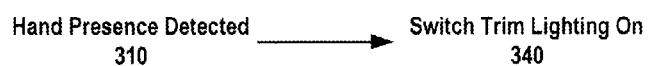

Numerous implementations are functions may be performed in response to determining that the user is gripping or otherwise grasping the device. FIG. 3A thru FIG. 3C illustrate specific implementations of how one or more embodiments may be performed.

In FIG. 3A, hand presence determination 310 is made on the device, corresponding to, for example, the user gripping or holding the device about its housing. In response to the hand presence determination, an embodiment provides that the device performs the state transition 330 of switching its ringer function from an audible mode into a vibration mode. Thus, for example, in the example provided by an embodiment of FIG. 3A, the mode setting may correspond to the ringing function of the device switching from an audible mode into a vibration mode. Such a mode switch may require, for example, transitioning the state of the vibration feature into an active state, while de-activating the ringer or speaker of the device. Additionally, on a programmatic level, a phone application or preference setting may be altered programmatically in response to the determination that the device is being held. In one implementation, the mode switch from audible mode to vibration mode may occur immediately in response to the user grabbing the device, even when the device is 'ringing'. For example, the user may hear the device ringing, then reach for it. The device detects it has been grabbed, and switched into vibration mode, thus enabling the user to turn his phone ringer off simply by grabbing the device.

In FIG. 3B, a scenario is illustrated where a software protective feature is disabled or suspended automatically when the user grips the device. Specifically, many cellular telephony devices have a key guard feature that precludes the user from being able to place a phone call. However, under many conventional approaches, disabling the key-guard feature is cumbersome. User's often have to hit a specific combinations of buttons prior to performing a task such as dialing a phone number. In contrast to conventional approaches, an embodiment provides that the key-guard feature of a device is automatically de-activated upon the determination that the device is being held or grasped in a user's hand.

More specifically, in response to the determination 310 being made that the device is being held, an embodiment provides for performance of the function 330 corresponding to disabling or discontinuing the key-guard protective feature. Thus, for example, the user would not have to perform the combination button actuation steps that would otherwise be needed in more conventional approaches.

FIG. 3C illustrates another usage scenario where decorative (or alternatively functional) lighting is switched on in response to detecting hand presence of the user. In particular, hand presence may be detected (step 310), and in response, some form of decorative or semi-functional lighting may be actuated (step 330). The lighting may serve as ornamental or identification of the device. In one implementation, trim lighting may be presence on the device, and when the determination of the hand presence is made, the processor triggers the trim lighting. As an alternative or variation, backlighting of the keypad/keyboard or display may be performed. In such cases, the lighting may also serve a purpose of providing the user with lighting when lighting conditions are otherwise dark or poor. Still further, illumination may be informative. For example, hand presence may illuminate a component of the device when a notification is to be communicated to the user.

Numerous other usage scenarios are contemplated with embodiments. Under one embodiment, the device performs one or more operations to ready itself for use. In this regard, the device may preempt actions that the user would otherwise take when initiating use of the device. Other more specific usage scenarios include turning on wireless radios (such as Wireless Fidelity or WiFi) in response to detecting the human touch or presence of the human hand.

In other scenarios, determination of hand presence may cause (i) illumination of a portion of a display surface, (ii) display of limited information on the display surface, such as a clock or a notification message or the number of messages awaiting the user, (iii) display of a status screen that shows status information (e.g. status of device power, account information, wireless signal strength etc.)

Sensor Array Configuration

FIG. 4A and FIG. 4B illustrate implementation of a sensor array for detecting human skin contact, under one or more embodiments. As described with an embodiment of FIG. 1, a sensor array comprising sensors for detecting human skin contact may be distributed on the housing to provide indication of (i) when the human skin contact occurs, or (ii) when the human skin contact is likely a hand. For example, the sensor array may be arranged to detect the device is actually being gripped (such as in a palm), or held in the user's finger grips, or still further placed flatly in a palm or other region of the user's skin.

FIG. 4A shows a back side 422 of a housing 420 of a computing device 400 on which at least a portion of the sensor array 410 is provided for detecting the user's hand presence. In an embodiment, the array 410 may arranged to detect, for example, when a two or more fingers of a user wrap behind the backside 422 of the housing 420. While the user's fingers would not typically be in complete contact, the fingers being placed behind the housing 420 may be known to have likely contact points along, for example, one or more diagonals 411, or at spot points 413. In the example provided, the spot points or at or near the perimeter edges and corners.

The particular sensor array 410 shown by embodiments of FIG. 4A and FIG. 4B are illustrative of an ability to distribute the sensor array in a particular arrangement that is known to be indicative of the user using his or her hands to operate the device. Numerous other arrangements are possible. For example, under one implementation, a column of sensors may be distributed near a perimeter edge column on each of a left and right side of the device, based on an assumption that the user will contact a region of the back surface near the perimeter edge when operating the device. Such a perimeter edge is illustrated by lines 417 and 419. Other arrangements for sensor array 410 may factor in, for example, housing shape or dimensions, cost of the sensor array, and handedness consideration of the user. For example, mirror arrangements may be used on the back surface 420 to accommodate both left and right handed users.

FIG. 4B illustrates a front face 440 of the device 400 with sensor configurations, under an embodiment. As an example, the device 400 may include a plurality of interface features, including a display component 444 (which may be touch or contact-sensitive) surface 444, a multi-way navigation and scrolling mechanism or button set 446, one or more application buttons or software feature buttons 448, and a keyboard 450. Given the interface components, one implementation may provide for sensors 412 of array 410 to be provided at or near a top 441 and lateral edges 443, 443 of the device, in anticipation that the fingers of the user may wrap around from the backside and reach over to the front side.

As an alternative or variation to embodiments described above, additional sensors may be provided on lateral or perimeter surfaces (not shown), extending between the back face 422 and the front face 440. In particular, with the set of interfaces shown by FIG. 4B, for example, sensors 412 may be provided on a top perimeter surface (extending towards back surface 420 from the top edge 441) and on lateral perimeter surfaces (extending towards back surface 420 from the lateral edges 443) that are proximate to, for example, the display surface 444.

To further implementation examples such as described with FIG. 2, and with reference to FIG. 4B, the output from sensors 412 of the sensor array 410 may be used to activate the display surface 444, the multi-way navigation and scrolling mechanism or button set 446, one or more application buttons or software feature buttons 448, and/or the keyboard 450.

With reference to an embodiment of FIG. 4A and FIG. 4B, an embodiment of the invention may be provided with use of the housing 420. The housing 420 may be structured separately to include a front face that provides a plurality of interface features (keypad, display component, multi-way input feature, buttons etc.), and a back face that is provided at least some of the sensors 412 in the array 410. Each of the sensors 412 on the back face 422, for example, may be positioned to detect a contact by a user at a location that has previously been determined to be a likely place where human skin contact is to occur when the user is operating the device. Likewise, some or all of the sensors on the front face 440 may be positioned or located with similar considerations.

Hardware Overview

FIG. 5 is a hardware diagram of a mobile computing device, under an embodiment. In an embodiment, a device 500 includes one or more processors 510, a display assembly 520, memory resources 530, and a plurality of hardware components that may include, for example, any one or more of vibration mechanism 542, microphone 544, speaker 546, keypad 548, backlight or lighting element 550, or other input/output component 552.

As described with an embodiment of FIG. 1, a sensor array 520 comprising a plurality of sensors 522 may be positioned relative to a housing or structure of the device 500 to detect human skin contact. In response to detecting human skin contact, the sensor array 520 as a whole, or individual sensors 522 that comprise the array may supply sensor information 512 to the processor 510. The processor 510 may then perform one or more state transition operations that affect the use of the device as a whole, and/or the sue of software or hardware components, such as any of the hardware components 542-552.

In one embodiment, the sensor information 512 is outputted with components (integrated circuits that comprise processing resources) of the sensor array 520 that enable the information to be received in digital form, and even predetermined as to whether the sensor reading (i) is indicative of human skin contact, and optionally (ii) the human skin contact corresponds to the user holding the device in his or her hand. As an alternative, however, the sensor array 520 may supply unprocessed or raw data. In such cases, an analog-digital converter (not shown) may be used to convert, for example, analog capacitive values of the sensors 522 into digital form. Additionally, the processor 510 may interpret the values as to whether the qualify as human skin contact and/or are indicative of the device being held by a hand.

As described, embodiments provide that the sensors 522 are capacitive sensors, meaning they individually detect a change in capacitance, from, for example, touch or proximity of human skin. Human skin is somewhat characteristic in that it can create measurable capacitance variations when brought into proximity of a capacitive sensor.

In addition to use of sensors, processor 510 and/or sensor array 520 may time the duration of the human skin contact to confirm the grasp or hand presence is not transient or inadvertent. For example, human skin contact that qualifies as hand presence and last more than one second may cause the processor 510 to perform its command operations.

As described with an embodiment of FIG. 2, the sensor information 512 may cause the processor 510 to perform state transition operations to change the state of the processor, other processors (not shown or modules), the device as a whole, or any of the hardware components or combinations that are under the control or the processor 510. The state transition operations for other components may be performed by way of one or more state commands 514. As another addition or alternative, the processor 510 may perform software level operations, such as alter the software settings of one or more components, or perform application functions, as part of the state transition operations.

Still further, another component that may be used on a device includes one or more wireless radios 554 or wireless radio communication modules. These may include, for example, radios for WiFi, Bluetooth, WiMax or cellular communications. Under an embodiment, the wireless radios may alternatively be controlled or otherwise transitioned in state when hand detection is determined.

As an optional component, sensor array 520 may include or be coupled to integrated circuit elements 525. The ICs 525 may perform functions that include any one or more of (i) reading sensor values, (ii) determining that human skin contact occurred, (iii) detecting hand presence, or (iv) waking the processor in response to specific sensor values or determinations. As another alternative, an analog circuit may be used to wake the processor when a sufficiently large sensor value is detected. Such circuits may be packaged with the sensors or provided separately but coupled to the sensor array.

Alternatives

While numerous embodiments described above provide for use of capacitance based sensors, other forms of detection or sensors may be used. In one embodiment, for example, sensors 412 (FIG. 4) may be replaced with conductive metal pads. The conductive metal pads may be integrated or surface mounted onto the housing. Human skin would trigger current to initiate from the pads, as human skin carries the electrical characteristic of amplifying background electromagnetic radiation. Such electromagnetic radiation has a characteristic frequency, such as in the range of 60 Hz. The pads would form a touch sensitive area that is connected to analog circuitry. The circuitry would monitor or react to a characteristic potential spike triggered by human touch. By tuning the pads and circuitry to respond to the frequency range that is characteristic of human skin, a differentiation is made possible between contact by human skin and contact by other objects. Moreover, such circuitry and pads may be tunable as needed.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for operating a computing device, the method comprising:
   programmatically making a determination as to whether a device is being held in a hand for at least a predetermined amount of time; and
   transitioning the device, or one or more of its hardware or software components, into a particular state of operation based on the determination.

2. The method of claim 1, wherein transitioning the device is performed automatically in response to making the determination.

3. The method of claim 1, wherein making a determination as to whether the device is being held in a hand includes detecting a presence of an electrical property that is characteristic of the hand.

4. The method of claim 3, wherein making a determination as to whether the device is being held for the predetermined amount of time includes detecting the presence of the electrical property for a duration of time that exceeds the predetermined amount of time.

5. The method of claim 3, wherein making the determination is performed using a capacitive or electrically conductive sensor.

6. The method of claim 1, wherein transitioning the device includes transitioning a power state of the device, or of one or more of its components, based on the determination that the device is being held for the predetermined amount of time.

7. The method of claim 6, wherein transitioning the device includes activating a display of the device.

8. The method of claim 6, wherein transitioning the device includes activating one or more hardware components of the device.

9. The method of claim 1, wherein transitioning the device includes:
   in response to making the determination that the device is not being held in the hand, activating a protective feature that prevents inadvertent use of the device;
   in response to making the determination that the device is being held in the hand for the predetermined amount of time, deactivating the protective feature.

10. The method of claim 1, wherein transitioning the device includes switching the device from audible mode into a silent or vibration mode in response to making the determination that the device is being held in the hand for the predetermined amount of time.

11. The method of claim 1, wherein transitioning the device includes illuminating one or more regions of the device in response to making the determination that the device is being held in the hand for the predetermined amount of time.

12. The method of claim 11, wherein illuminating one or more regions of the device includes illuminating a trim lighting element.

13. A computing device comprising:
   processing resources, including one or more processors that are operable to enable use of a plurality of software components and a plurality of hardware components;
   a housing that retains the one or more processors and other electrical components of the computing device;
   one or more sensors that are configured to detect an electrical characteristic of a hand of a user in contact with the device;

wherein the processing resources are configured to make a determination as to whether the computing device is being held in the hand based at least in part on whether the electrical characteristic of the hand is detected by the one or more sensors for at least a predetermined amount of time;

and wherein the processor is configured to transition the device, or one or more of each of the plurality of software or hardware components, into a particular state of operation based on the determination.

14. The computing device of claim 13, wherein the one or more sensors include one or more capacitive sensors.

15. The computing device of claim 13, wherein the one or more sensors include one or more conductive sensors.

16. The computing device of claim 13, wherein the one or more sensors are arranged as an array on a back surface of the housing.

17. The computing device of claim 13, wherein the one or more sensors are positioned on a back surface of the housing at select locations that are determined as likely locations of contact by a palm of a finger surface of the user.

18. The computing device of claim 13, wherein the processing resources include one or more integrated circuits used with or by the plurality of sensors.

19. The computing device of claim 13, wherein the processor is configured to transition the computing device, or one or more of its hardware components, into an active state in response to the processing resources making the determination that the device is being held in the hand for the predetermined amount of time.

20. The computing device of claim 13, wherein the processor is configured to switch the computing device, or one or more of its hardware components, into a higher power state in response to the processing resources making the determination that the device is being held in the hand for the predetermined amount of time.

21. The computing device of claim 13, wherein the processor is configured to illuminate one or more regions of the computing device in response to the processing resources making the determination that the device is being held in the hand for the predetermined amount of time.

22. The computing device of claim 13, wherein the processor is configured to switch the computing device from an audible mode into a vibration mode in response to processing resources making the determination that the device is being held in the hand for the predetermined amount of time.

23. A method for enabling use of a mobile computing device, the method comprising:
maintaining a programmatic control feature to prevent inadvertent use of a keypad of a mobile computing device;
programmatically making a determination that the computing device is held in a user's hand for at least a predetermined amount of time; and
in response to making the determination, automatically disabling the programmatic control feature to enable use of the keypad of the mobile computing device.

24. A housing for a computing device, the housing comprising:
a front face and a back face;
wherein the front face is structured to provide a display surface, a keypad, and a multi-way input feature;
wherein the back face includes at least a portion of an array of sensors, wherein each of the sensors on the back face are positioned to detect a contact by a user for a predetermined amount of time at a location that has previously been determined to be a likely place where human skin contact is to occur when the user is operating the device.

25. A computing device comprising:
processing resources, including one or more processors that are operable to enable use of a plurality of software components and a plurality of hardware components;
a housing that retains the one or more processors and other electrical components of the computing device, the housing including a front face and a back face;
a plurality of interface features provided on the front face of the housing, the plurality interface features including a contact or touch sensitive display component, a multi-way input feature, and a keypad;
a plurality of sensors that are configured to detect an electrical characteristic of a hand of a user in contact with the device;
wherein the processing resources are configured to make a determination as to whether the computing device is being held in the hand based, at least in part, on whether the electrical characteristic of the hand is detected by one or more of the plurality of sensors for at least a predetermined amount of time; and
wherein the processor is configured to transition any one or more of the plurality of interface features into a particular state of operation based on the determination.

* * * * *